United States Patent
Brownjohn et al.

(10) Patent No.: US 8,955,804 B2
(45) Date of Patent: Feb. 17, 2015

(54) AIRCRAFT STRUCTURE WITH AIR DUCTS INTEGRATED IN STRUCTURAL ELEMENTS

(75) Inventors: Nicholas Brownjohn, Buxtehude (DE); Georg Mühlthaler, Hamburg (DE); Stefan Osternack, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/240,897

(22) Filed: Sep. 22, 2011

(65) Prior Publication Data
US 2012/0248244 A1    Oct. 4, 2012

Related U.S. Application Data

(63) Continuation of application No. PCT/EP2010/053520, filed on Mar. 18, 2010.

(60) Provisional application No. 61/162,534, filed on Mar. 23, 2009.

(30) Foreign Application Priority Data

Mar. 23, 2009   (DE) .................. 10 2009 014 377

(51) Int. Cl.
  *B64D 13/00*   (2006.01)
  *B64C 1/06*   (2006.01)

(52) U.S. Cl.
  CPC ............. *B64C 1/061* (2013.01); *B64C 1/064* (2013.01); *B64C 1/068* (2013.01); *B64D 13/00* (2013.01); *Y02T 50/44* (2013.01)
  USPC ............. 244/118.5; 244/119; 454/76; 454/83

(58) Field of Classification Search
  USPC ........... 244/119, 118.5, 117 A, 120; 165/235; 454/76, 83, 109, 133
  See application file for complete search history.

(56) References Cited

U.S. PATENT DOCUMENTS

| | | | | |
|---|---|---|---|---|
| 4,726,426 A | * | 2/1988 | Miller | 169/62 |
| 4,749,004 A | * | 6/1988 | Peash | 137/865 |
| 5,083,727 A | | 1/1992 | Pompei et al. | |
| 5,479,983 A | * | 1/1996 | Fischer et al. | 165/205 |
| 5,897,079 A | * | 4/1999 | Specht et al. | 244/118.5 |
| 6,889,936 B1 | | 5/2005 | Pho et al. | |

(Continued)

FOREIGN PATENT DOCUMENTS

| | | |
|---|---|---|
| CA | 2699643 A1 | 3/2009 |
| DE | 102006002248 A1 | 7/2007 |

(Continued)

OTHER PUBLICATIONS

International Search Report dated Sep. 14, 2010 for International Application No. PCT/EP2010/053520.

(Continued)

*Primary Examiner* — Tien Dinh
*Assistant Examiner* — Vicente Rodriguez
(74) *Attorney, Agent, or Firm* — Ingrassia Fisher & Lorenz, P.C.

(57) ABSTRACT

An aircraft structure is provided with load-bearing hollow structural elements that form an aircraft fuselage. The cavities in the structural elements are designed as air ducts for an air conditioning system of the aircraft. An aircraft is also provided with such an aircraft structure.

10 Claims, 8 Drawing Sheets

(56) References Cited

U.S. PATENT DOCUMENTS

| | | | |
|---|---|---|---|
| 7,299,511 B2 | 11/2007 | Quan | |
| 8,262,023 B2 * | 9/2012 | Kofinger et al. | 244/119 |
| 2005/0044712 A1 | 3/2005 | Gideon et al. | |
| 2008/0237397 A1 | 10/2008 | Seibt | |
| 2009/0044800 A1 * | 2/2009 | Jorn | 128/203.12 |
| 2010/0148003 A1 | 6/2010 | Verweyen | |
| 2011/0009042 A1 * | 1/2011 | Joern | 454/71 |

FOREIGN PATENT DOCUMENTS

| | | |
|---|---|---|
| DE | 102007044389 A1 | 4/2009 |
| DE | 102007061429 A1 | 7/2009 |
| RU | 2056312 C1 | 3/1996 |
| RU | 2186712 C2 | 8/2002 |
| SU | 86766 A1 | 10/1950 |
| WO | WO2007082644 A1 * 8/2007 ............... B64C 1/00 |
| WO | 2009037006 A1 | 3/2009 |

OTHER PUBLICATIONS

International Preliminary Report on Patentability dated Oct. 6, 2011 for International Application No. PCT/EP2010/053520.

State Intellectual Property Office of the Peoples' Republic of China, Office Action for Chinese Patent Application No. 201080013297.5, mailed Apr. 1, 2014.

* cited by examiner

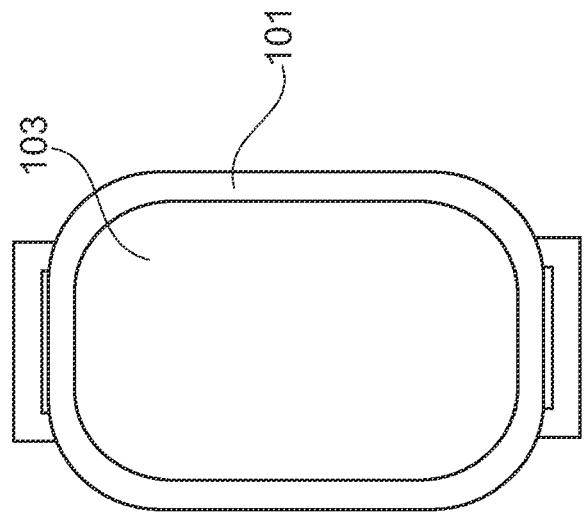
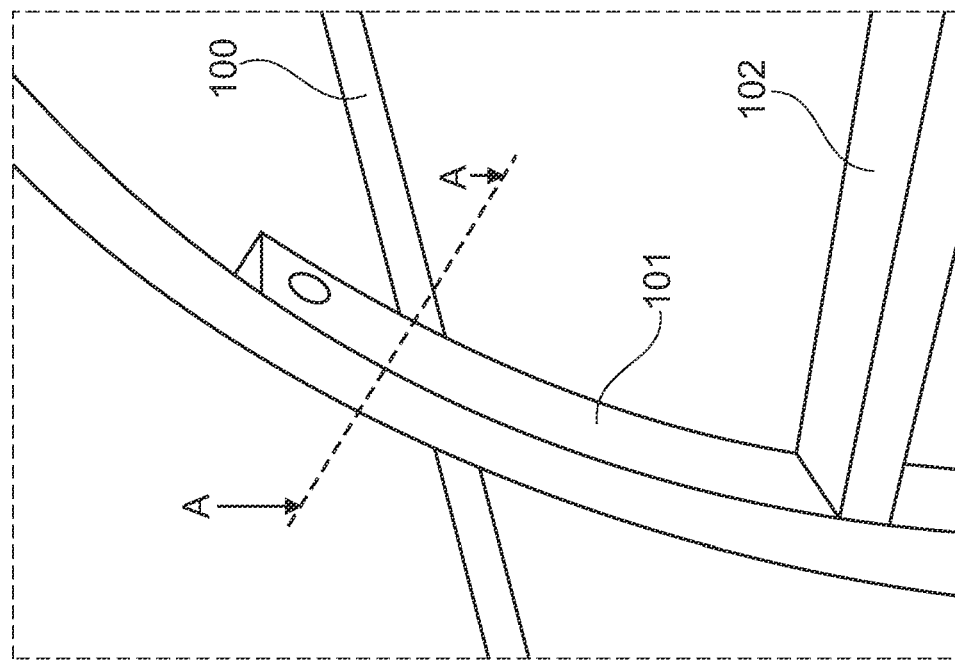

AIRCRAFT STRUCTURE WITH AIR DUCTS INTEGRATED IN STRUCTURAL ELEMENTS

CROSS-REFERENCE TO RELATED APPLICATIONS

This application is a continuation of International Application No. PCT/EP2010/053520, filed Mar. 18, 2010, which was published under PCT Article 21(2) and which claims priority to U.S. Provisional Patent Application No. 61/162,534 filed 23 Mar. 2009 and of German Patent Application No. 10 2009 014 377.7 filed 23 Mar. 2009, the disclosure of which applications is hereby incorporated herein by reference.

TECHNICAL FIELD

The technical field relates to an aircraft structure with load-bearing hollow structural elements that form an aircraft fuselage.

BACKGROUND

FIG. 1 shows a conventional aircraft 10 with an aircraft fuselage 11. Such an aircraft fuselage 11 is usually comprised of structural elements that encompass longitudinal frames, transverse frames and transverse beams. These structural elements form a cylindrical lattice structure, which is covered by the outer skin of an aircraft.

FIG. 2 shows such a conventional structural design for an aircraft fuselage structure. The longitudinal frames 12 here run essentially parallel to each other spaced a certain distance apart in the longitudinal direction of the aircraft. Transverse frames 13 run transverse to the longitudinal direction of the aircraft, setting the cross sectional (cylindrical) shape of the aircraft fuselage and crossing the longitudinal frames 12 essentially at right angles. The lattice structure consisting of longitudinal frames 12 and transverse frames 13 is covered by the outer skin of the aircraft 14. Openings for windows 15 or other openings, for example for doors, emergency exits, etc., are provided between two adjacent transverse frames 13. Air ducts 16 that convey air for conditioning the air in the aircraft passenger cabin from an air conditioning system (not shown) into the passenger compartment run between the transverse frames 13 and window openings 15, essentially parallel to the transverse frames 13.

FIG. 3 shows a sectional view from above in the area of the window openings. As evident, the window opening 15 expands like a funnel from the outer skin of the fuselage 17 to an inner paneling 14 of the aircraft passenger cabin. A primary window 18 is initially provided in the window opening 15 on the outside, wherein this primary window 18 is followed by a secondary window 20, with a specific ventilated area 19 lying in between the two. This secondary window 20 is followed by an inner window 21, separated by a larger, ventilated gap. The air ducts 16 are arranged on either side of the funnel-shaped window opening 15. Viewed from above, these air ducts 16 each are situated between the transverse frames 13 and window opening 15.

In view of the foregoing, at least one object is to create alternatives for an aircraft structure that prove advantageous. In addition, other objects, desirable features and characteristics will become apparent from the subsequent summary and detailed description, and the appended claims, taken in conjunction with the accompanying drawings and this background.

SUMMARY

At least some of the subject-matter relates to an aircraft structure. Advantageous further developments are evident from the following summary and description.

One exemplary embodiment provides for an aircraft structure with hollow, load-bearing structural elements that form an aircraft fuselage. The cavities in the structural elements are designed as air ducts for an air conditioning system of the aircraft. An advantage to the above may be that it yields synergistic effects, and the structural elements simultaneously comprise the load-bearing, primary structure of the aircraft and serve as the air ducts for the air conditioning system. This may make it possible to diminish the fuselage thickness (distance from the inner trim or paneling to the outer skin of the aircraft), thereby yielding an enlarged passenger cabin diameter for a specific outer diameter of the fuselage. Another advantage may be that the windows can be enlarged as a result, which may lead to a brighter aircraft cabin with a pleasant atmosphere. In this conjunction, the structural elements may be longitudinal frames, transverse frames and/or transverse beams.

In another exemplary embodiment, the aircraft structure is configured in such a way that the structural elements cross each other, and the air ducts provided in the cavities can be joined together at the intersecting points. This enables the design of a completely flexibly controllable air supply system, for example in the form of a network, which spans the aircraft fuselage, and makes numerous areas of the aircraft fuselage accessible for air conditioning purposes by way of the junctions provided at the intersecting points. It may be advantageous if the air ducts can be joined by means of activatable and controllable actuators.

Another exemplary embodiment provides that control valves are furnished in the air ducts for controlling the air flow. As a consequence, the air flow and/or air pressure in each air duct can be dynamically balanced, adjusted and configured.

In another exemplary embodiment, the aircraft structure is constructed in such a way that the structural elements provided with air ducts form a network that at least partially spans the aircraft structure. As a result, a network of air ducts is already made available with the assembly of the aircraft structure comprising the aircraft fuselage, thereby eliminating the need for an additional operation, and allowing for the flexible use of this air duct network. In addition, a tangible savings in weight may be affected for the aircraft structure by integrating the air ducts into the structural elements. Weight may further be reduced by making the structural elements out of carbon fiber.

Another exemplary embodiment provides two air ducts in the cavity of a structural element, which are configured in such a way as to carry air in opposite directions. As a result, an even more flexible network of air ducts may be provided for air conditioning purposes.

Another exemplary embodiment provides an aircraft with an aircraft structure according to one of the exemplary embodiments described above and below. An advantage to this aircraft may be that it exhibits a lower tare weight than other aircraft, which in turn may make it possible to increase the payload to be conveyed. This may make the aircraft fabricated in this way more economical for the aircraft operator.

BRIEF DESCRIPTION OF THE DRAWINGS

FIG. 4a shows an intersecting point between a longitudinal frame and transverse frame according to an exemplary embodiment;

FIG. 4b shows a cross sectional view along the line A-A indicated on FIG. 4a;

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
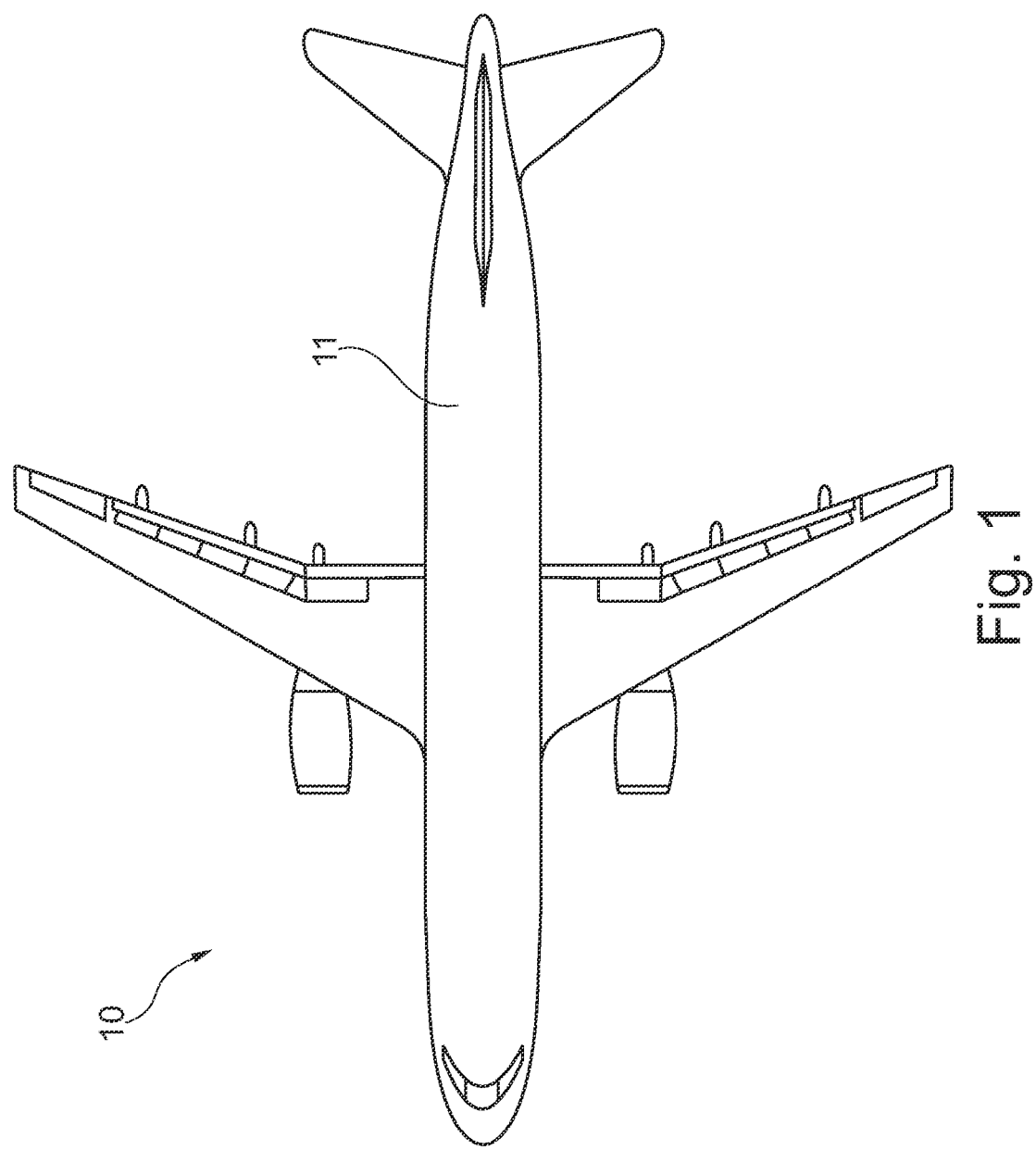
FIG. 1 shows an aircraft with an aircraft fuselage comprised of primary structural elements.
Figure 2:
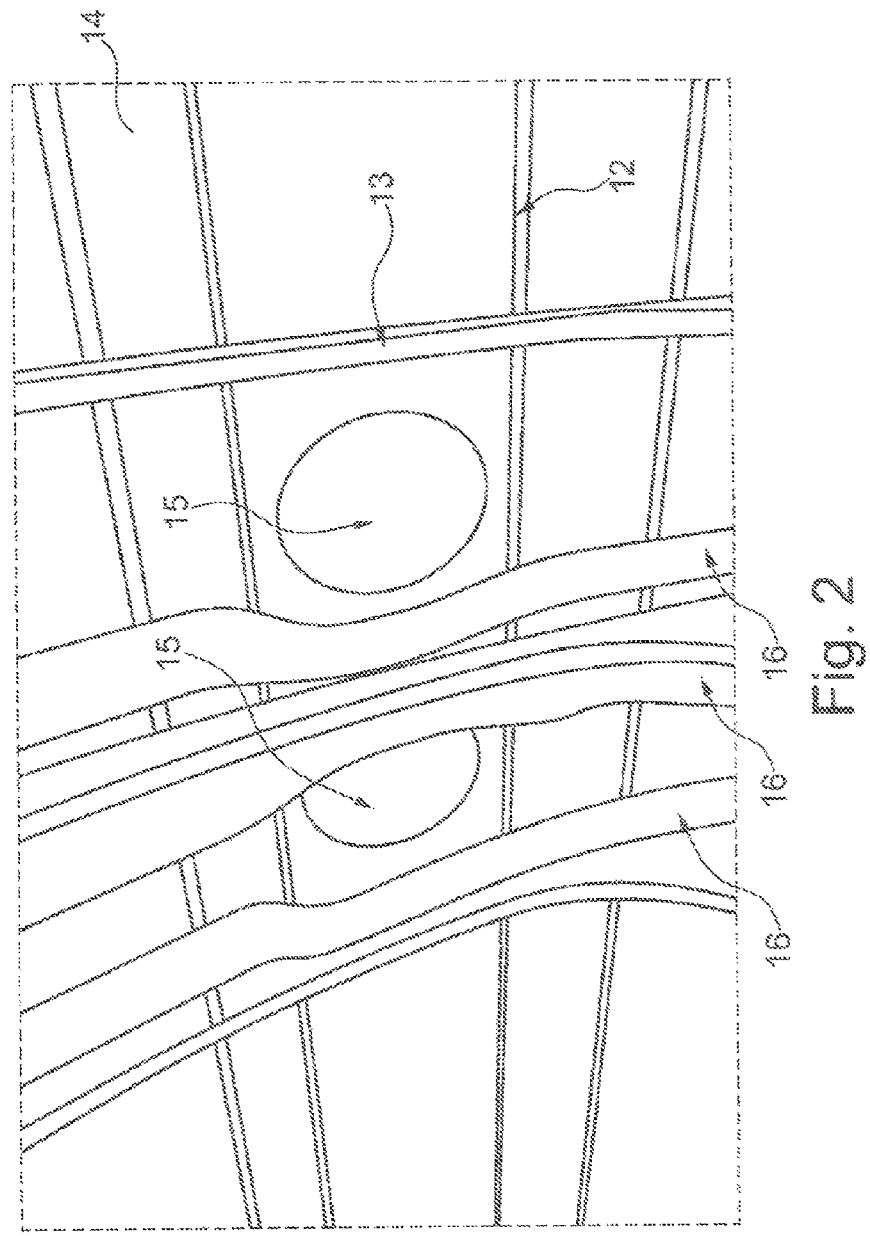
FIG. 2 shows a conventional aircraft structure design.
Figure 3:
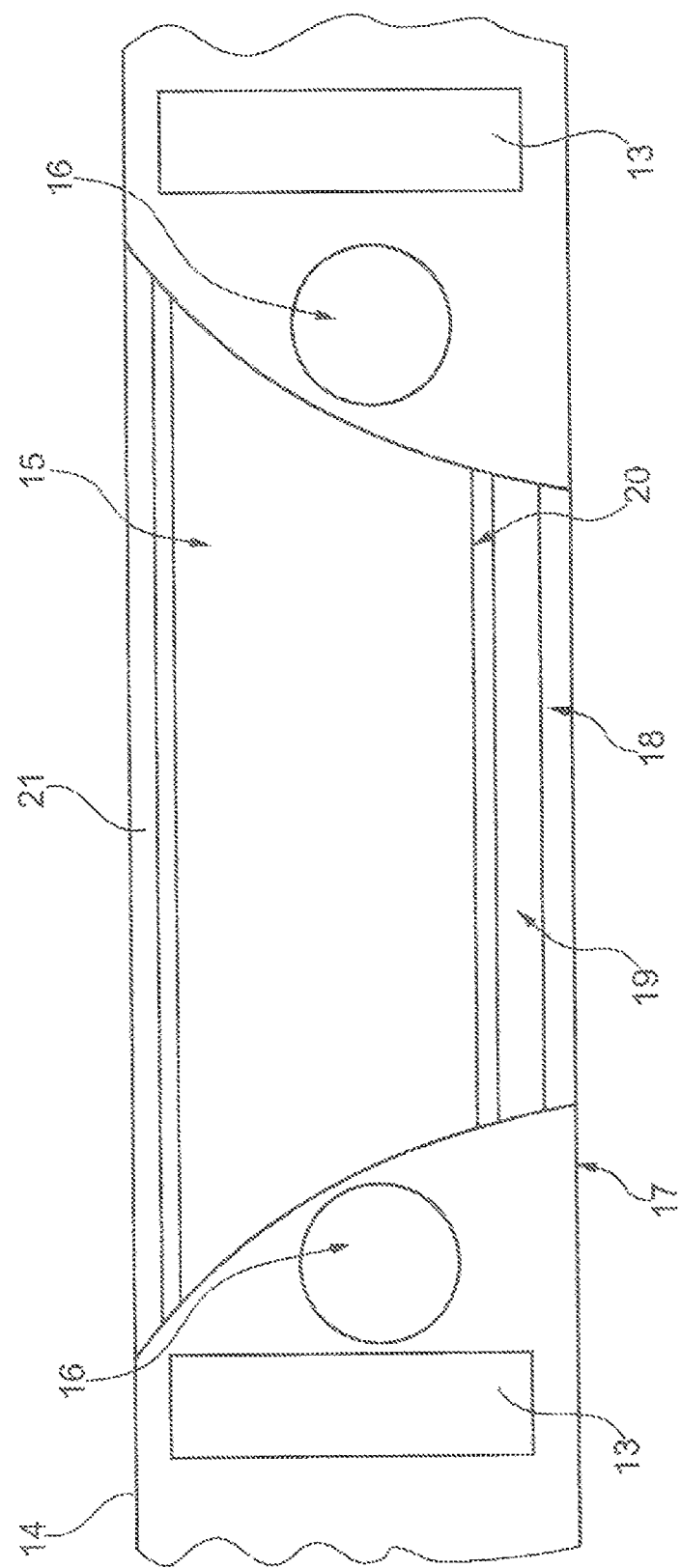
FIG. 3 shows a cross sectional view from above in the area of the window openings.

FIG. 4a shows an intersecting point between the longitudinal frame 100 and transverse frame 101. As already described with reference to FIG. 2, longitudinal frames 100 run in the longitudinal direction of the aircraft, while transverse frames 101 run essentially at a right angle thereto. These transverse frames 101 essentially set the outer shape of the fuselage cross section, curving around a longitudinal axis of the aircraft 10. Transverse beams 102 run transverse to the longitudinal direction of the aircraft and in the horizontal (in relation to the aircraft on the ground), and can accommodate a cabin floor or cargo hold floor, for example. In aircraft construction, several longitudinal frames 100 usually run parallel to each other in the longitudinal direction of the aircraft. These structural elements 100, 101 and 102 can be made out of metal, metal matrix composites or composite materials such as epoxy resins reinforced with carbon fiber or fiberglass. These structural elements 100, 101 and 102 are so-called primary structural elements, which absorb forces that act on the aircraft fuselage 11, i.e., load-bearing components.

FIG. 4b presents a sectional view along the line A-A indicated on FIG. 4a. The section runs essentially perpendicular to the longitudinal direction of the transverse frame 101. FIG. 4b shows the transverse frame 101, the wall of which absorbs the forces acting on the fuselage, and ensures the stability of the aircraft fuselage 11. The curved transverse frame 101 is essentially rectangular in cross section, with rounded corners, and with a hollow interior. The cavity inside the transverse frame 101 comprises an air duct 103, which transports air for air conditioning purposes from an air conditioning system (not shown) into an aircraft passenger compartment (and/or a cargo hold).

Figure 5:
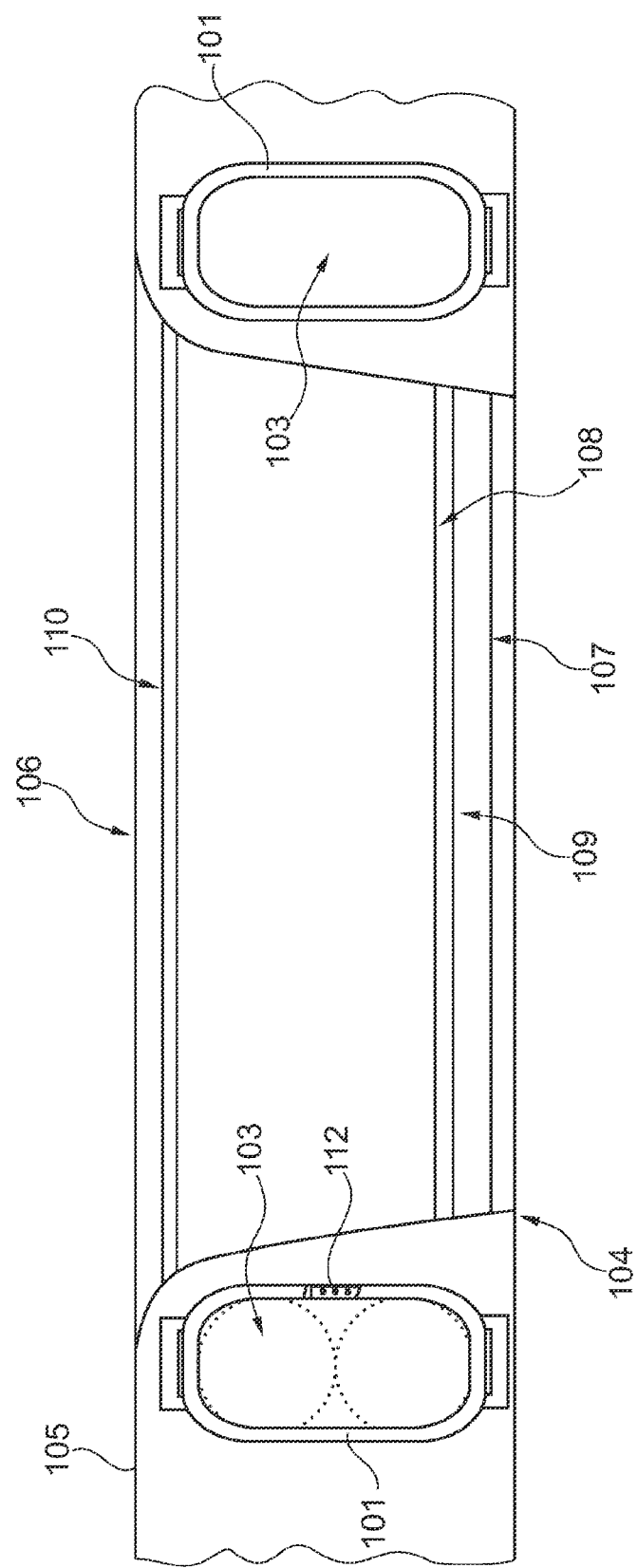
FIG. 5 shows a cross sectional view from above in the window area according to an exemplary embodiment.
Figure 6A:
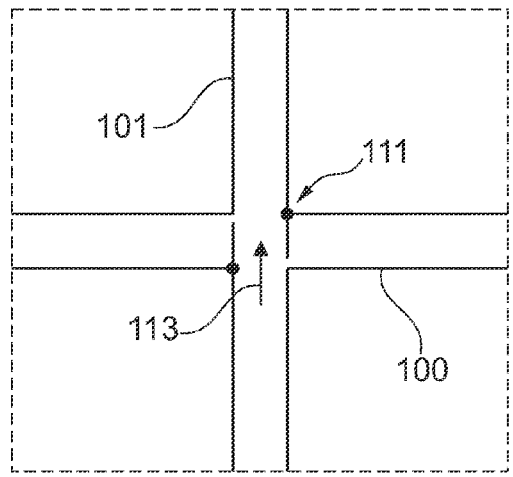
FIG. 6a-6d show an intersecting point between a transverse frame and longitudinal frame according to an exemplary embodiment.
Figure 6B:
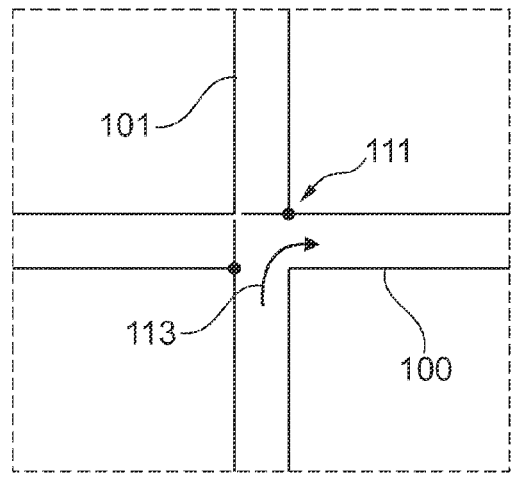
Figure 6C:
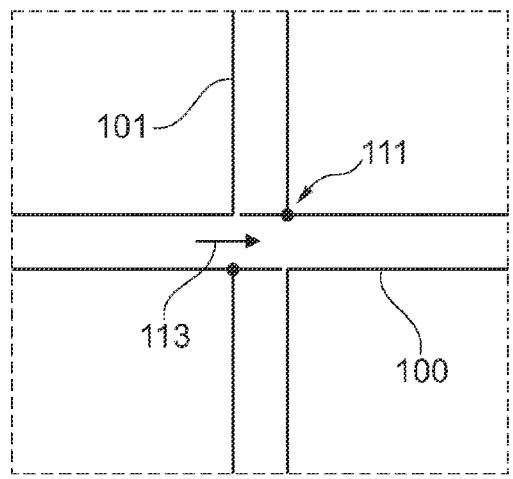
Figure 6D:
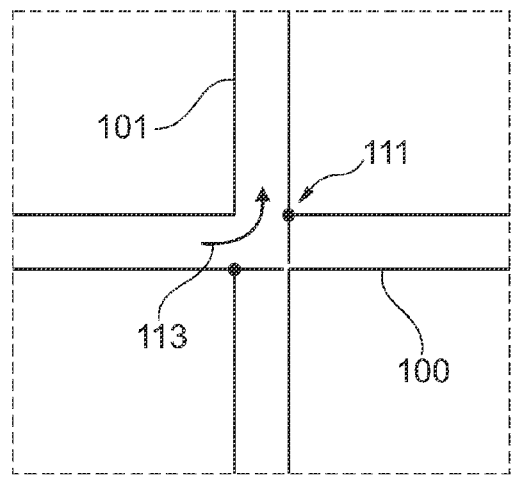

FIG. 5 shows a sectional view from above in the area of a window opening 106 according to an exemplary embodiment. A window opening 106 extends essentially like a funnel between the outer skin of the fuselage 104 and the inner trim or paneling of the cabin 105. The window opening 106 is provided with a primary window 107 on the outside of the fuselage, essentially flush with the outer skin of the fuselage 104. Situated adjacent to the primary window is a secondary window 108, wherein a ventilated area 109 is formed between the primary window 107 and secondary window 108. An inner window 110 is arranged on the interior, i.e., toward the passenger compartment, wherein a ventilated area is provided between the secondary window 108 and inner window 110. The transverse frames 101 with the air guides 103 incorporated therein run on either side of the window opening 106. The air guides 103 can here be designed in such a way that the wall of the transverse frame 101 carries the air, as provided in the transverse frame 101 depicted on the right side of FIG. 5. In addition, the air guides 103 can be designed to exhibit their own wall, making it possible to also provide several air guides 103 inside a cavity of a transverse frame 101, as is the case with respect to the transverse frame 101 depicted on the left side of FIG. 5. Such air guides 103 can be configured in such a way, for example, that two air guides 103 are provided inside a transverse frame 101, which are tubular, and one of the two air guides 103 carries air in one direction, and the other of the two air guides 103 carries air in the opposite direction. The configuration described above can also be provided in proximity to doors or emergency exits, i.e., the window opening 106 can also be an opening for a door or emergency exit.

In another further embodiment, the material of the structural elements 100, 101 and 102 can imbed in particular optical lines, but also electrical lines 112. Alternatively, these lines can also be arranged on the structural elements and rigidly connected with the latter. This yields another functional advancement, as a result of which the structural elements also assume the function of carrying air and relaying, i.e. transmitting, power, data, etc., to go along with their load-bearing function. This may reduce work stages necessary during assembly of the aircraft, since these functionalities are already realized with the completion of the fuselage structure.

FIG. 6a to FIG. 6d show various positions of a diagrammatically depicted actuator, which is arranged at an intersecting point between the longitudinal frame 100 and transverse frame 101. The actuator 111 is here diagrammatically depicted as two pivoting flaps, the position of which may make it possible to divert an air flow 113 coming from the air duct 103 arranged in one transverse frame 101 into an air duct 103 provided in a longitudinal frame 100 or vice versa, as needed. The diverted air flow is denoted by an arrow 113 on FIG. 6a to FIG. 6d. However, another option would be to align the actuator 111 in such a way that no diversion takes place, and the air flow continues streaming in the receptive longitudinal frame 100 or transverse frame 101 at the intersecting point. With respect to system controllability, it would be ideal to provide each intersecting point between a longitudinal frame 100 and transverse frame 101 with such an actuator 111, but a compromise must in practice be found between controllability and the acceptable tare weight of an aircraft, since the tare weight of the aircraft is increased with each actuator. For example, wing valves can here be used as the actuator 111.

Figure 7:
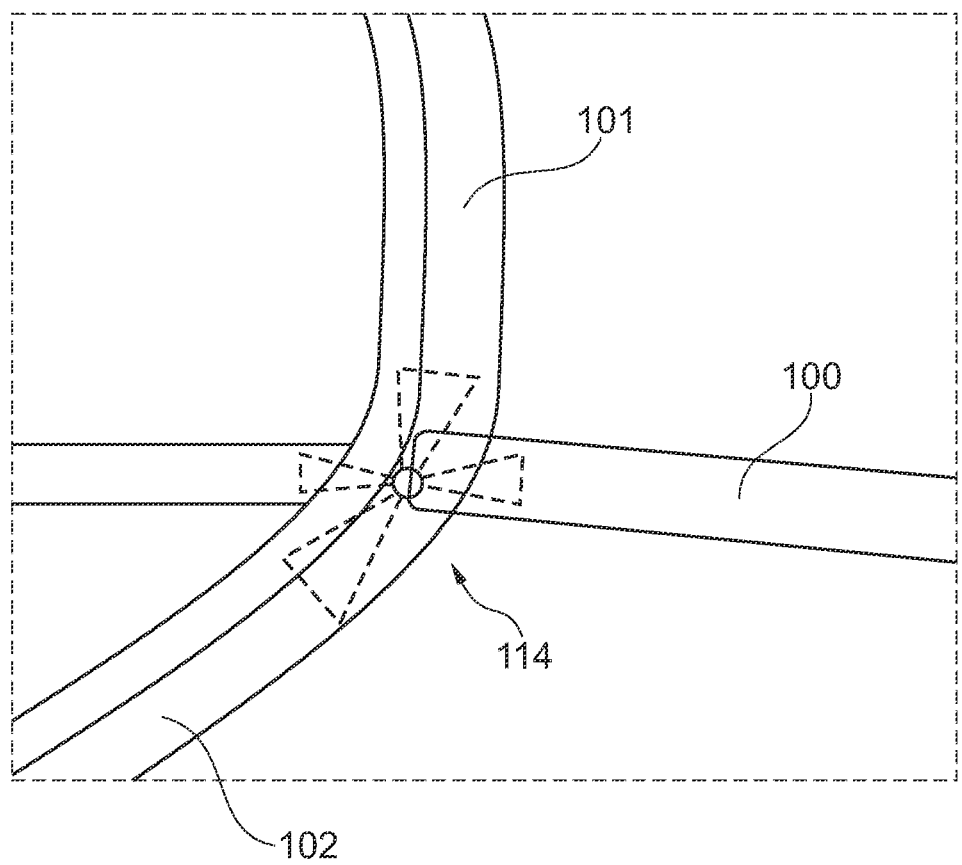
FIG. 7 shows an intersecting point between the transverse frame, longitudinal frame and transverse beam according to an exemplary embodiment.

FIG. 7 shows an intersecting point between the transverse frame 101, longitudinal frame 100 and transverse beam 102 according to an exemplary embodiment. An actuator 114 can be provided in the respective air ducts 103 at such an intersecting point, and also designed as a wing valve. The actuator 114 can divert an air flow from a transverse beam 102 to a transverse frame 101 or longitudinal frame 100 or vice versa. The actuator 114 can further divert an air flow from a longitudinal frame 100 to a transverse frame 101 or transverse beam 102 or vice versa.

Figure 8:
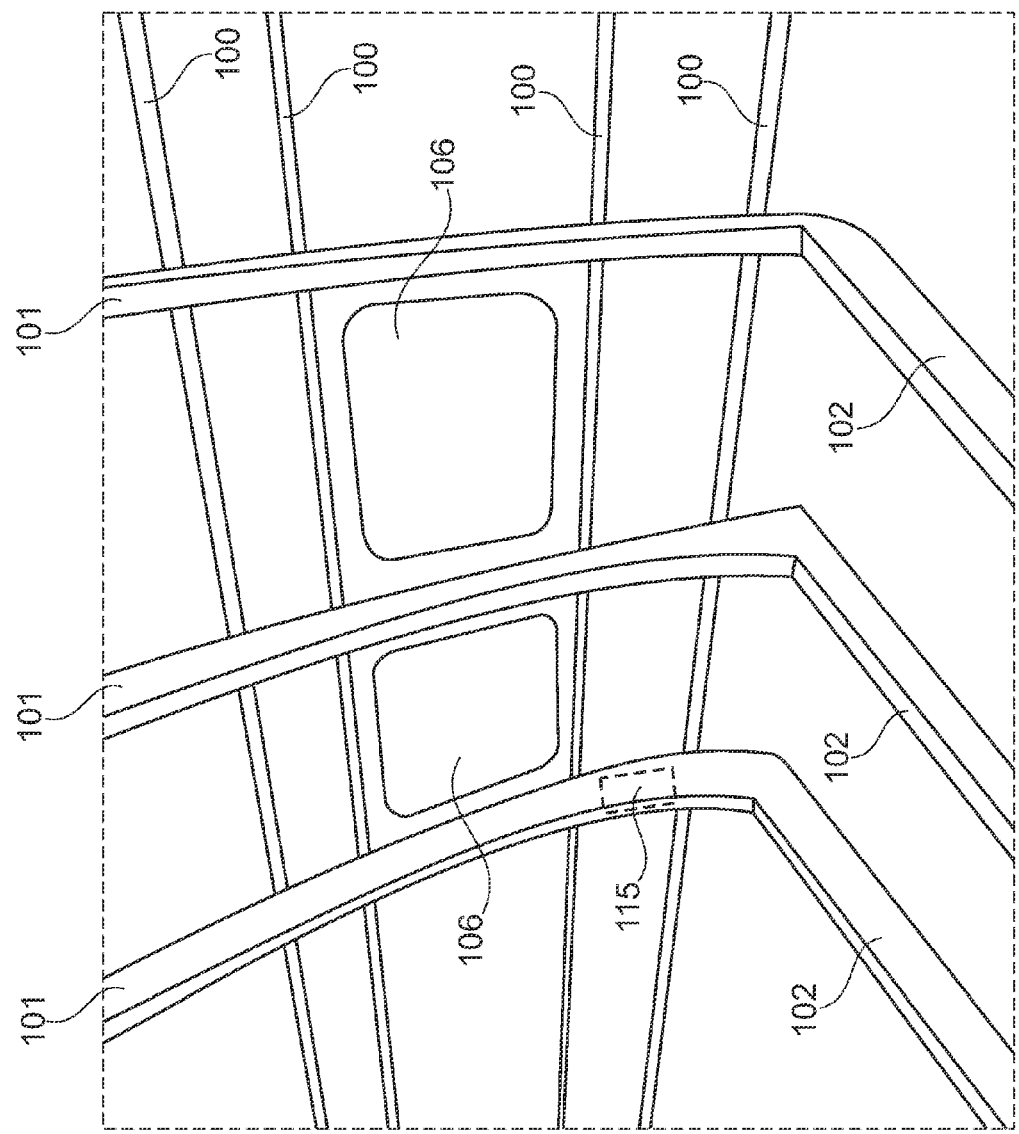
FIG. 8 shows a segment of the aircraft fuselage with the integrated air ducts according to an exemplary embodiment.

FIG. 8 shows a segment of the aircraft fuselage 11 with the integrated air ducts 103 according to an exemplary embodiment. As evident from this depiction, longitudinal frames 100, transverse frames 101 and transverse beams 102 form a lattice structure that defines the shape of the aircraft fuselage. The air ducts 103 are here integrated into all structural elements 100, 101 and 102 as described. Several or all intersecting points between these structural elements 100, 101 and 102 incorporate actuators 111 or 114, which are no longer depicted for the sake of clarity. A variable control valve 115 is also provided in the air ducts 103, wherein only a single control valve 115 is diagrammatically denoted on FIG. 8 for reasons of clarity. This control valve 115 controls the flow cross section of the respective air duct 103, and serves to control the air flow and/or air pressure in the respective air duct 103. One or several such control valves 115 are preferably provided in each longitudinal frame 100, each transverse frame 101 and each transverse beam 102, and preferably at the location where air is supplied to the respective air duct 103, or just after an intersecting point. A compromise will also have to be found in practice between controllability and aircraft weight optimization for the control valves 115. The control valve 115 is preferably a Venturi valve, which is situated in the cross section of the air duct 103. As a consequence, the actuators 111 and 114 are used to control how a stream of air is to be carried, and whether it can even flow through the air duct, while the control valves 115 are used to set the flow in the respective air duct 103. The functionalities of these actuators/control valves can also be combined, making it possible to provide control elements at the intersecting points of structural elements 100, 101, 102 that combine the described functionalities.

Consequently, the described exemplary embodiment ideally creates a network comprised of air ducts 103 integrated in structural elements 100, 101, 102 that span the complete passenger cabin, which can be programmed and configured to customer specifications by means of a control unit coupled with the actuators 111, 114 and control valves 115. As a result, the air conditioning and air flow distribution in the passenger cabin can be changed and adjusted by varyingly activating the actuators 111, 114 and control valve 115, without requiring any retrofitting work. This is especially advantageous with respect to changing the configuration of the passenger cabin (altered seat spacing, modified placement of kitchens, toilets, etc.). Given such a change in configuration, the air conditioning and air distribution can be conveniently tailored to this new configuration at the push of a button given a correctly programmed control unit.

Let it be noted that features described with reference to one of the above exemplary embodiments or a configuration can also be used in combination with other features from other of the above exemplary embodiments. "A" and "an" do not exclude a plurality and the term "comprising" does not exclude other elements or steps. In addition, while at least one exemplary embodiment has been presented in the foregoing summary and detailed description of the invention, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. An aircraft structure for an aircraft, comprising:
    an aircraft fuselage formed at least partially from hollow and load-bearing structural elements, each hollow and load-bearing structural element including a cavity defined within each of the hollow and load-bearing structural elements, each cavity configured as an air duct for an air conditioning system of the aircraft; and
    an air supply system provided by the hollow and load-bearing structural elements crossing each other such that a network is formed that at least partially spans the aircraft structure,
    wherein the air ducts in the cavities are joined together at intersecting points where the hollow and load-bearing structural elements cross each other, and at least one of the intersecting points defined by two of the hollow and load-bearing structural elements crossing each other includes an actuator movable to divert air flow from one of the two hollow and load-bearing structural elements into another of the two hollow and load-bearing structural elements, and
    wherein the hollow and load-bearing structural elements include a longitudinal frame and a transverse frame of the aircraft fuselage.

2. The aircraft structure of claim 1, wherein the hollow and load-bearing structural elements include transverse beams.

3. The aircraft structure of claim 1, further comprising control valves in air ducts, the control valves configured to control air flow.

4. The aircraft structure of claim 1, wherein the structural elements comprise a carbon fiber.

5. The aircraft structure of claim 1, further comprising two air ducts in a cavity of a structural element, the two air ducts configured to carry air in opposite directions.

6. An aircraft, comprising:
    an air conditioning system;
    an aircraft fuselage;
    an aircraft structure comprising hollow and load-bearing structural elements that form the aircraft fuselage, each hollow and load-bearing structural element including a cavity defined within each of the hollow and load-bearing structural elements, each cavity configured as an air duct for the air conditioning system; and
    an air supply system provided by the hollow and load-bearing structural elements crossing each other such that a network is formed that at least partially spans the aircraft structure,
    wherein the cavities configured as the air ducts are joined together at intersecting points where the hollow and load-bearing structural elements cross each other, and at least one of the intersecting points defined by two of the hollow and load-bearing structural elements crossing each other includes an actuator movable to divert air flow from one of the two hollow and load-bearing structural elements into another of the two hollow and load-bearing structural elements, and
    wherein the hollow and load-bearing structural elements include a longitudinal frame and a transverse frame of the aircraft fuselage.

7. The aircraft of claim 6, wherein the hollow and load-bearing structural elements include transverse beams.

8. The aircraft of claim 6, further comprising control valves in the air ducts, the control valves configured to control air flow.

9. The aircraft of claim 6, wherein the structural elements comprise a carbon fiber.

10. The aircraft of claim 6, further comprising two air ducts in a cavity of a structural element, the two air ducts configured to carry air in opposite directions.

* * * * *